United States Patent Office 3,432,355
Patented Mar. 11, 1969

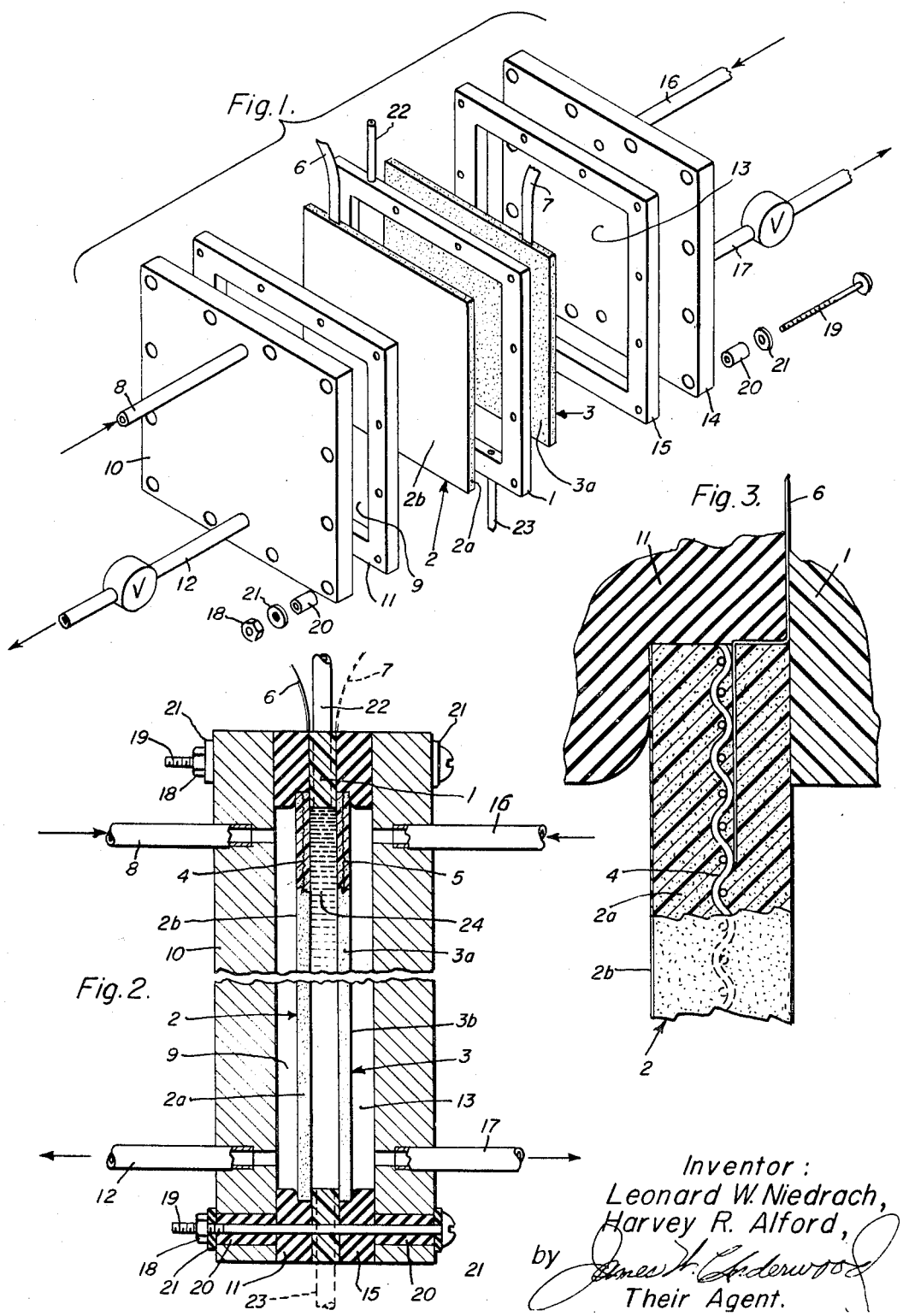

3,432,355
POLYTETRAFLUOROETHYLENE COATED AND BONDED CELL STRUCTURES
Leonard W. Niedrach and Harvey R. Alford, Schenectady, N.Y., assignors to General Electric Company, a corporation of New York
Filed Oct. 24, 1962, Ser. No. 232,689
U.S. Cl. 136—86                16 Claims
Int. Cl. H01m 27/06

This invention relates to improved fuel cell electrode structures and gaseous fuel cells containing such electrodes. More particularly, this invention relates to improved gas permeable, hydrophobic electrodes and to improved gaseous fuel cells containing such electrodes. The fuel cell comprises a pair of gas adsorbing, gas permeable, hydrophobic, electronically conductive electrode elements in direct contact with an aqueous electrolyte solution. The electrodes comprise gas adsorbing metal particles bonded together into a cohesive mass with polytetrafluoroethylene and have a coating of polytetrafluoroethylene bonded to the electrode surface in contact with the gas phase. These novel electrode structures, when used in combination with the aqueous electrolyte produce gaseous fuel cells which do not require special fabrication or additional precautions to prevent the electrolyte from flooding the surface of the electrode in contact with the gas phase, and thereby "drowning" the electrodes which would deleteriously affect the performance of the fuel cell reaction.

In the copending application of Niedrach, Ser. No. 108,418, filed May 8, 1961, now U.S. Patent 3,297,484, and assigned to the same assignee as the present invention, there are disclosed and claimed electrode structures comprising catalytically active, gas adsorbing particles bonded together with polytetrafluoroethylene and fuel cells incorporating such electrodes in which the aqueous electrolyte was sorbed in a solid matrix. This solid matrix was necessary since the eletcrolyte was held within the matrix by capillary forces which were strong enough to prevent the aqueous electrolyte from diffusing through the electrodes and flooding the surface of the electrodes in contact with the gas, thereby interfering with the reaction occurring between the gas and electrolyte at the metal surface.

Although such cells have a high volume efficiency, the matrix does increase the internal resistance of such fuel cells and therefore it is desirable to further increase the volume efficiency of the fuel cells by eliminating the matrix. We have now discovered that the matrix may be eliminated and flooding of the electrodes prevented by providing a coating of polytetrafluoroethylene firmly and integrally bonded to the entire surface of the electrode which is in contact with the gas phase. Since the cell reaction which produces electricity occurs at the three-phase interface where the gas, metal particles and electrolyte are all present, it was indeed surprising to find that the hydrophobic film of polytetrafluoroethylene did not interfere with the cell reaction, while at the same time it rendered the electrode impervious to the aqueous electrolyte without interfering with the formation of the three-phase interface. Apparently, the polytetrafluoroethylene film is porous enough to permit gas to readily pass through but because the walls of such pores are hydrophobic, the electrolyte does not wet the surface and does not readily pass through. Furthermore, our electrodes can be made relatively thin, e.g., 5–10 mils thick, so that any diffusion of fuel or oxidant gases is over a very short distance. This is of particular advantage where air is used as the oxidant, since such thin structures do not become blocked with the nitrogen in the air to the extent encountered in thicker electrode structures thereby minimizing any polarization effects which reduce the current densities of the fuel cells. This advantage is also desirable when the fuel cells are operating on hydrocarbon gases which produce carbon dioxide as the oxidized produce which must be removed from the cell. Similarly, the thin electrode structures result in short electrolyte paths in the electrode structure and thereby minimize polarization due to liquid phase concentration gradients within the electrolyte.

An object of the present invention is to provide a novel fuel cell electrode structure.

A further object of this invention is to provide a fuel cell incorporating these electrodes which has a high volume efficiency, high power capability, low polarization, high stability and high efficiency.

These and other objects of our invention are accomplished by incorporating at least one gas adsorbing metal as metal particles in polytetrafluoroethylene and fabricating this into a sheet having a coating of polytetrafluoroethylene bonded to one of the two major surfaces of the sheet. This sheet can be fabricated in the desired shape of the electrode or cut to the desired shape after fabrication to produce an electrode structure which is gas permeable, hydrophobic and electronically conductive. The fuel cell comprises an aqueous electrolyte solution which is positioned between and in direct electrical contact with a pair of these gas permeable, hydrophobic, electronically conductive electrode elements comprising gas adsorbing metal particles bonded together into a cohesive mass with polytetrafluoroethylene and having a coating of polytetrafluoroethylene bonded to the surface of the electrode in contact with the gas phase, means for supplying a gaseous fuel to one of said electrodes and means for providing a supply of oxidant gas to the other electrode.

Our invention may be better understood by reference to the following description taken in conjunction with the drawing, in which, FIG. 1 is an exploded view of a fuel cell within the present invention;

FIG. 2 is an enlarged, cross-sectional view of the assembled fuel cell shown in FIG. 1 to show structural detail, and FIG. 3 is an enlarged, cross-sectional view of the electrode structure shown in FIG. 2 to show further structural detail.

Although a number of different types of electrode structures are suitable for use in the cells of the present invention, each electrode should be one which: is electronically conductive, will adsorb the fuel or oxidant employed, will act as a catalyst for the electrode reaction, and will not itself oxidize severely under the operating conditions of the cell. Suitable gas adsorbing metals are well known and many are described for example in "Catalysts, Inorganic and Organic," Berkman, Morrel and Egloff, Reinhold Publishing Co., New York (1940); "Catalytic Chemistry," H. W. Lohse, Chemical Publishing Co., Inc., New York (1945); etc. Suitable materials include the noble metals of Group VIII series of metals of the Periodic Table of Elements, which are rhodium, ruthenium, palladium, osmium, iridium, and platinum. Other suitable metals include the other metals of Group VIII, e.g., nickel, iron, cobalt, etc., as well as other metals known to catalytically adsorb gases, e.g., silver, copper and metals of the transition series, e.g., manganese, vanadium, rhenium, etc. In addition to electrodes formed of these metals the electrodes can be formed of platinum or palladium black which has been deposited on a base metal such as stainless steel, iron, nickel and the like. In addition, suitable electrodes may be formed from metal oxides and carbon which have been activated with platinum or palladium, or from carbon which has been activated with oxides of iron, magnesium, cobalt, copper, etc.

Since the adsorption of gases on solids is a surface phenomena, it is desirable that the electrodes be of the maximum practicable surface area and that the surface of the metal particles preferably be in its most active state for the adsorption of gases. For maximum cell efficiency, the maximum permissible area of one side of each electrode should be in complete contact with the aqueous electrolyte and the maximum permissible surface of the other side of each electrode should be in contact with the fuel or oxidant gas. For these reasons, we prefer to use finely divided metal powders, having highly developed surfaces areas, for example, at least 10 square meters per gram, and preferably at least 100 square meters per gram in fabricating our electrode structures. Mixtures of two or more metals may also be used. For maximum cell performance, we prefer to make the electrodes by using the very active metal powders of the Group VIII metals, for example, platinum black, palladium black, Raney nickel, and so forth. The noble metals of the Group VIII series of metals have the further advantage in that when the electrolyte is an acid, corrosion conditions exist at both the anode and cathode which shorten the life of the cells having electrodes incorporating metals such as nickel, iron, copper, etc. This effect does not occur in cells having electrodes made from the noble metals of the Group VIII metals. The corrosive effect is not as pronounced in fuel cells using bases as the electrolyte. Long cell life may be obtained by using any metals which are resistant to bases, for example, the Group VIII metals, including nickel, cobalt, etc., as well as other known gas adsorbing metals, e.g., rhenium, in cells having an aqueous base electrolyte. Choice between these materials is covered by design considerations, intended use, desired lifetime, gases used for fuel and oxidant, etc.

Many ways are available for constructing the catalytically active electrodes. A means which can be used to easily construct our electrodes is to take an aqueous emulsion of polytetrafluoroethylene resin and form a thin film on a casting surface such as a sheet of metal foil, metal plate, etc., forming the final shape of the electrode, if desired, evaporating the water and wetting agent from the emulsion, followed by sintering of the polytetrafluoroethylene, under pressure if desired, a a temperature high enough to cause the sintering of the individual particles of polytetrafluoroethylene into a coherent mass, e.g., from 325° to 450° C., preferably from 350° to 400° C. The time of heating is sufficient to insure that all particles of resin reach the desired temperature, usually 1 to 2 minutes. Thereafter, an aqueous emulsion of polytetrafluoroethylene resin is mixed with sufficient metal particles that the final layer prepared from this mixture is electronically conductive, for example, from 2 to 20 grams of the metal powder per gram of polytetrafluoroethylene resin in the emulsion. This mixture is spread in a thin layer on the previously formed film of polytetrafluoroethylene resin followed by evaporation of the water and wetting agents from the emulsion and sintering of the polytetrafluoroethylene in the mix, preferably under pressure, for example, 1000 to 3000 p.s.i. at a temperature of 350 to 400° C. for 2 to 10 minutes. Thereafter, the electrode is removed from the casting surface and is cut to the desired shape if not so formed by the casting operation.

If a current collecting grid is to be incorporated into the electrode structure, such a current collecting grid, for example, metal wires, metal strip, metal wire mesh, sintered porous sheet, etc., may be incorporated into the aqueous polytetrafluoroethylene metal mix before evaporation of the water. Alternatively, a sandwich-type of electrode may be made wherein a casting surface is first coated with polytetrafluoroethylene, followed by a coating of the polytetrafluoroethylene-metal mix which is dried but need not be sintered. The polytetrafluoroethylene-metal mix is also used to cast a thin layer on a separate casting surface without first forming the polytetrafluoroethylene film. This is dried but need not be sintered and a sandwich is then made with the current collecting grid between the two layers still on the casting surfaces. This sandwich is pressed and sintered, followed by removal of the casting surfaces to give an electrode in which the current collecting grid forms an integral part of the electrode.

We have found that these procedures using an aqueous polytetrafluoroethylene emulsion are extremely desirable since they produce a gas permeable, electronically conductive, hydrophobic electrode having a very high mechanical strength without any further processing. The electrode structure which incorporates the terminal grid is especially desirable since the terminal grid is in better electrical contact and lends strength to the electrode. Alternatively, a preformed film of polytetrafluoroethylene may be used directly as the casting surface for casting the polytetrafluoroethylene-metal mix. Alternatively, a polytetrafluoroethylene film may be molded to one surface of an electrode made from the polytetrafluoroethylene-metal mix or the film may be formed by spraying or spreading the polytetrafluoroethylene emulsion on the surface of an electrode made from polytetrafluoroethylene-metal mix, followed by drying and sintering. Likewise, instead of using an aqueous polytetrafluoroethylene emulsion with the metal powder may be mixed with dry powdered polytetrafluoroethylene, shaped, pressed and sintered into either thin sheets or thick masses which can be shaped or cut to thin sheets, which are then pressed and sintered to a thin film of polytetrafluoroethylene to form the electrodes. Since aqueous emulsions of polytetrafluoroethylene are readily available as commercial products, we prefer to use the emulsion technique in the forming of our electrodes. On the other hand, it is to be understood that in forming the electrode, the resin and metal powder mix may be calendered, pressed, cast or otherwise formed into a sheet.

Without departing from the scope of our invention fillers such as fibrous cloth or mat, preferably of fibers that are resistant to highly acidic or basic conditions which they will encounter in the fuel cell, for example, glass, asbestos, acrylonitrile, vinylidene chloride, polytetrafluoroethylene, etc., fibers may be impregnated and surface coated with a mixture of polytetrafluoroethylene and metal powder. Such a technique may be desirable if the current collecting grid is not incorporated as an integral part of the electrode, but is merely pressed to the surface of the electrode on the electrolyte side where it can make contact with the metal particles. Such a technique tends to decrease the effective surface area of the electrode in contact with the electrolyte and therefore we prefer to incorporate the current collecting grid into the electrode structure.

Although other materials such as polytrifluorochloroethylene, polyethylene, polypropylene, polytrifluoroethylene, etc., could conceivably be substituted for the polytetrafluoroethylene, the chemical resistance of these materials is inferior to polytetrafluoroethylene under the conditions encountered in the fuel cells and therefore such substitution could only be made with considerable sacrifice in the desired performance and stability of the electrodes.

The aqueous electrolytes are usually aqueous solutions of strong acids or strong bases, but salt system having buffering action may be used. Strong acids and strong bases are those having a high degree of ionization. Salt systems having buffering action are well known, for example, sodium dihydrogen phosphate-potassium monohydrogen phosphate, potassium carbonate-potassium bicarbonate, phosphoric acid-sodium dihydrogen phosphate, etc. The concentration of the electrolyte should be as high as can be tolerated by the materials of construction of the cell. Likewise, the electrolyte must be soluble in the aqueous phase and should have a low enough vapor pressure that it does not volatilize into the gaseous phase. Because of these limitations, the most desirable electrolytes are sulfuric acid, phosphoric acid, the aromatic sulfonic acids such as benzene, mono-, di- and trisulfonic acids, toluene mono-, di- and trisulfonic acids, the napthalene sulfonic acids such as the α- and β-naphthalene monosulfonic acids and the various naphthalene disulfonic acids, etc. In general, acids and bases having a dissociation constant of at least $1 \times 10^{-4}$ are satisfactory. Typical of the bases which may be used are sodium hydroxide, potassium hydroxide, lithium hydroxide, cesium hydroxide, rubidium hydroxide, etc. In view of their ready availability, stability under fuel cell operating conditions, low cost and high degree of ionization in aqueous solution, we prefer to use inorganic acids, e.g., sulfuric acid, phosphoric acid, etc., or inorganic bases, for example, sodium hydroxide, potassium hydroxide, etc.

As has been mentioned previously, the electrodes may have either a current collecting grid incorporated into the electrode structure or pressed to the surface in contact with the electrolyte. These current collecting grids or terminals are made of a good electrical conductor and suitably may be a screen, metal wires, metal bars, punched or expanded metal plates, porous metal sheet, etc., and are electrically connected to the appropriate electrical lead. In this application, the current collecting terminal structure will be referred to as a terminal grid. As will be readily apparent, the fuel cells of this invention may be connected in series or parallel arrangement to form batteries of any desired voltage or current output.

The fuel cells of this invention are operable at room temperature and atmospheric pressure. If desired, the cells may be operated above or below ambient atmospheric conditions of temperature and pressure within the limits of the freezing and boiling point of the aqueous electrolytes used in the cells. To avoid rupture of the electrodes, the pressure of the fuel and oxidant gases in contact with the electrodes should not exceed the ability of the electrodes to withstand the force.

For a more complete understanding of the gaseous fuel cells and electrodes of the present invention, reference is made to the drawing, in which:

FIG. 1 is an exploded schematic drawing of a fuel cell of the present invention;

FIG. 2 is an enlarged vertical cross-sectional view of the cell; and

FIG. 3 is an enlarged vertical cross-sectional view of a portion of the electrode to show further structural detail.

The cell comprises electrolyte 24 which is retained within the cell in the space formed by electrodes 2 and 3 bearing against spacer 1 which has ports 22 and 23 for introducing and draining the electrolyte 24 or circulating the electrolyte 24, if desired, during operation of the cell to maintain the electrolyte at a given, desired concentration. Leads 6 and 7 connected to terminal grids 4 and 5, respectively, are used to deliver electrical current to the apparatus being operated by the fuel cell. Fuel gas is supplied from a storage source (not shown) to inlet 8 to electrode 2 or is contained solely in chamber 9 formed by end plate 10, gasket 11 and electrode 2. A valved outlet 12 is provided to exhaust any impurities which enter or accumulate in chamber 9. The oxidant gas is supplied from a storage source (not shown) through inlet 16 to electrode 3 or is contained solely in chamber 13 formed by end plate 14, gasket 15 and electrode 3. Valved outlet 17 is provided for the withdrawal of impurities which enter or accumulate in chamber 13. In normal operation with hydrogen and oxygen, the valves in outlets 12 and 17 are closed. If air is to be used as the oxidant gas, end plate 14 may be provided, if desired, with one or more large openings and inlet 16 and outlet 17 eliminated. The end plates and gaskets are held in gas tight relationship with each other by means of a plurality of nuts 18, insulating washers 21 and bolts 19 which have insulating sleeves 20 which concentrically fit into the holes around the periphery of the end plates 10 and 14, spacer 1 and gaskets 11 and 15. Other alternative means of clamping these elements together are readily apparent to those skilled in the art. End plates 10 and 14 and spacer 1 can be made of any material which has structural strength and can resist the corrosion conditions encountered in the cell. The end plates 10 and 14 may be made of metal, but are preferably made from an insulating material as is spacer 1, e.g., polystyrene, polymethylmethacrylate, vulcanized fiber, fibrous or fabric based phenolic, urea or melamine laminates, hard rubber, polytetrafluoroethylene, etc. In the latter case, insulating sleeves 20 and insulating washers 21 may be omitted. Gaskets 11 and 15 may be made from any resilient, rubbery type of polymer, but preferably one which is not affected by the fuel and oxidant gases or their reaction products with which the gases come in contact. Suitable materials would be, for example, the synthetic rubbery elastomers such as silicone rubber, rubbery copolymers of ethylene and propylene or butene, rubbery copolymers of fluorinated ethylene, synthetic rubbery copolymers of butadiene and styrene, acrylonitrile, isoprene, butene, chloroprene, or the homopolymers of chloroprene, etc. The insulating sleeves 20 and insulating washer 21 may be fabricated from any of the known insulators such as those used for making end plates 10 and 14.

FIG. 2 shows a vertical cross-sectional view of a cell of FIG. 1 in the plane of gas inlets 8 and 16 and outlets 12 and 17. In FIG. 2, electrodes 2 and 3 have been fabricated with the terminal grids 4 and 5, respectively, incorporated as an integral part of the electrodes. They are illustrated as being made from metal wire screen as shown in greater detail by the enlarged view of electrode 2 shown in FIG. 3. The metal-polytetrafluoroethylene layer 2a is usually only thick enough that it fills the interstices and surface-coats terminal grid 4 with a very thin surface layer. However, as stated previously, the terminal grids may be separate and clamped firmly by means of spacer 1 to the surface of the electrode which is in contact with the electrolyte. In assembling the cell, the tightening of nuts 18 on bolts 19 compresses gaskets 11 and 15 so that electrodes 2 and 3 are held in a liquid and gas-tight relationship against spacer 1.

Electrode 2, which is shown in enlarged detail in FIG. 3, has the polytetrafluoroethylene-metal composition 2a which is exposed to the electrolyte 24 and the film of polytetrafluoroethylene devoid of metal particles 2b on the surface in contact with the fuel gas. The terminal grid 4 is illustrated as being made of a wire mesh to which is electrically connected electrical lead 6, for example, by welding, soldering, etc., which is led to the outside of the fuel cell between the surfaces of gasket 11 and spacer 1. Electrode 3 is similarly constructed except that the surface coated with the polytetrafluoroethylene devoid of metal particles is exposed to the oxidant gas.

When the electrolyte 24 is an acid, the fuel gas is hydrogen and the oxidant gas is air or oxygen, the overall cell reaction is the oxidation of hydrogen to water. The respective cell reactions producing electricity at the anode 2 and cathode 3 are as follows:

(1) $\qquad H_2 = 2H^+ + 2e$ (2) $\qquad \frac{1}{2}O_2 + 2H^+ + 2e = H_2O$

Where hydrogen is used as the fuel gas, it is noted that the product of the overall cell reaction is water.

This product, water, may be allowed to accumulate in the electrolyte which is confined between the hydrophobic electrodes, in which case dilution occurs with an accompanying increase in volume. This increase in volume of the electrolyte may be readily compensated for by permitting the electrolyte to rise through port 22 into a reservoir (not shown) if port 23 is closed, but preferably the electrolyte is circulated from port 22 to a reservoir of electrolyte where the water can be conveniently removed by evaporation or distillation to restore the initial concentration of the electrolyte which is then returned to the fuel cell through port 23. This circulation may be on a continuous or intermittent basis, as desired.

In this way, a substantially invariant electrolyte may be maintained in the cell proper.

Alternatively, the water formed in the cell reaction may be evaporated into the gas phase in the electrode chambers from which it can be removed by condensation or dispensed with in a gaseous waste stream. This procedure will be particularly useful if air is used as the oxidant. In some cases, evaporation into the gas stream may be at a rate such that the electrolyte becomes more concentrated. In this case, it may be desirable to add water to the electrolyte which may, if desired, be obtained by condensing water from the gas phase. By elevating the reservoir above the cell, concentration and thermal gradients may be utilized to provide circulation of the electrolyte.

When the cell employs a base as an electrolyte, the overall cell reaction producing electricity is again the oxidation of hydrogen to water with the electrode reactions being:

(3) $\quad H_2 + 2OH^- = 2H_2O + 2e$
(4) $\quad \frac{1}{2}O_2 + H_2O + 2e = 2OH^-$ In this case, the water balance in the electrolyte may be maintained as described above.

The cell of FIGURES 1 and 2 may also be operated with gaseous hydrocarbons as the fuel. In such a case, when the electrolyte 24 is acidic, the fuel gas is, for example, methane, and the oxidant gas is air or oxygen, the overall cell reaction is the oxidation of the hydrocarbon to carbon dioxide and water. The carbon dioxide, which accumulates in chamber 9, may be withdrawn through valved outlet 12, and the water balance in the electrolyte may be maintained as outlined above. The respective cell reaction producing electricity at the anode 2 and cathode 3 are as follows:

(5) $\quad CH_4 + 2H_2O = CO_2 + 8H^+ + 8e$
(6) $\quad 2O_2 + 8H^+ + 8e = 4H_2O$ When an alkaline electrolyte is employed the nature of the reactions will be dependent upon operation and in some cases important transients will be observed. If the starting electrolyte is a strong base like potassium hydroxide, the initial reactions will be:

(7) $\quad CH_4 + 10OH^- = CO_3^= + 7H_2O + 8e$
(8) $\quad 2O_2 + 4H_2O + 8e = 8OH^-$ As is evident from Equations 7 and 8, the formation of carbonate ion at the anode is accompanied by a depletion of the hydroxyl ion concentration. As the cell continues to operate, the carbonate ion will be converted to bicarbonate ion and carbonic acid in the electrolyte. Eventually a state of equilibrium will be reached, at which point $CO_2$ rather than carbonate ion will be the product of the cell reaction and will be rejected from the electrolyte as with the acidic electrolyte. The equilibrium concentrations of the various species will be determined by operating conditions such as temperature, total concentration, and the partial pressure of $CO_2$ that is permitted to accumulate in chamber 9.

If a carbonate system were used as the initial electrolyte, an entirely reasonable procedure, conditions would adjust more rapidly to equilibrium than in the case of the strong base. Initial transients would still be observed, however, in view of the sensitivity of the equilibrium to operating conditions.

One pitfall that must be avoided in considering the use of such alkaline and carbonate systems with carbonaceous fuels is the solubility equilibrium for the system. Care must be exercised to select concentrations such that all possible species, i.e., hydroxide, carbonate and bicarbonate, will remain in solution over the desired range of operating conditions. This means that when most alkali metal hydroxides and carbonates are used as electrolytes in fuel cells using carbonaceous fuels, their concentration must be below the range which would give optimum cell performance. This results from two causes, the increased internal resistance of the cell due to the lower conductivity of the electrolyte and the lower boiling point of the solution which limits the maximum temperature at which the cell can be operated.

A solution to this problem, whereby cesium and rubidium hydroxides, carbonates or bicarbonates are used, is disclosed and claimed in the copending application of E. J. Cairns, Ser. No. 232,688, now abandoned, filed concurrently herewith and assigned to the same assignee as the present invention.

The cell of FIGURES 1 and 2 may also be operated with carbon monoxide or a mixture of carbon monoxide with hydrogen and/or carbon dioxide as the fuel. In the case of pure carbon monoxide, an acidic electrolyte, and oxygen as the oxidant, the overall cell reaction is the production of carbon dioxide by the following anodic reaction:

(9) $\quad CO + H_2O \rightarrow CO_2 + 2H^+ + 2e$

If a mixture containing hydrogen is used the concurrent anodic reaction for the hydrogen will be the same as in Equation 1. The cathodic reaction in all cases will be that in Equation 2.

Operation of alkaline cells with carbon monoxide or its mixtures with hydrogen and/or carbon dioxide will result in transients analogous to those discussed above under the hydrocarbons. The initial anode reaction of the carbon monoxide in the presence of a strongly basic electrolyte such as potassium hydroxide will be:

(10) $\quad CO + 4OH^- = CO_3^= + 2H_2O + 2e$

Again there will be gradual neutralization to bicarbonate and carbonic acid until equilibrium is reached, at which point $CO_2$ is rejected. Any carbon dioxide introduced, with the fuel, is inactive as a fuel but would enter into some reactions with the electrolyte as discussed above for the carbon dioxide produced by the cell reaction.

The following examples are illustrative of the practice of our invention and are given by way of illustration only and are not for purposes of limitation.

In general, the cells used in the following examples were constructed as schematically illustrated in the drawings, except that the plates, gaskets and electrodes were round instead of square as shown. End plates 10 and 14 and spacer 23 were constructed from sheets of polymethylmethacrylate, gaskets 11 and 15 were either silicone rubber or a rubbery copolymer of ethylene and butene, and the electrolyte was usually circulated through the cell to maintain a fairly constant electrolyte concentration in the cell by a mechanical pump or by the thermal gradient existing in the electrolyte in the cell and reservoir. The terminal grids were incorporated in the electrode structure. The cells were operated at ambient conditions; however, the actual temperature of the cells varied depending on the power output due to heating caused by the internal resistance of the cell.

The general method of preparing the electrodes was as follows. An aqueous suspension containing 59.6% by weight polytetrafluoroethylene was diluted with 7 volumes of water. A rigid aluminum foil was used as the casting surface on which was scribed the ultimately desired pattern of the electrodes. The aluminum was placed on a hot plate maintained at 120–150° C. to facilitate evaporation of the water as the polytetrafluoroethylene emulsion was sprayed onto it, using an air brush. The desired amount of spray per unit area was evenly distributed over the surface at a rate such that wet areas did not accumulate and run. After the desired amount of emulsion had been sprayed onto the casting surface, it was heated at 350° C. to volatilize the emulsifying agent and to sinter the polytetrafluoroethylene particles into a coherent film. A mixture of the metal powder with the polytetrafluoroethylene emulsion was then prepared and diluted with sufficient water to give a thin slurry which could be conveniently spread over the polytetrafluoroethylene film on the casting surface to cover the scribed area showing the pattern of the desired electrode. When a uniform coating was achieved, the water was slowly evaporated from the emulsion on a hot plate whose bed temperature was slowly increased to a final value of 250–350° C. to dispel the emulsifying agent. To incorporate the current electrode grid in the electrode, a similar procedure was used to form a second polytetrafluoroethylene-metal powder mix directly on another casting surface without an underlying polytetrafluoroethylene film. The terminal grid, cut to the desired shape, was centered over the electrode pattern on one of the two casting surfaces and the other casting surface was then centered on top of the terminal grid. This assembly was placed between two press platens and molded at 350° C. for 2 minutes at pressures which were between 180 and 3000 lbs./sq. inch of electrode surface. Following pressing, the aluminum foil casting surfaces were dissolved from the electrodes in 20% aqueous sodium hydroxide and the electrode structures rinsed with water and dried. By this technique, electrodes were produced in which the terminal grid was sintered in the polytetrafluoroethylene-metal mix and the electrode was coated on one side with a pure film of polytetrafluoroethylene.

Example 1

In this example, electrodes were made in which the polytetrafluoroethylene surface film was varied in thickness by depositing 0.79, 1.6, 2.4 and 3.9 milligrams of polytetrafluoroethylene per square centimeter on casting surfaces. On these polytetrafluoroethylene surfaces an aqueous slurry of platinum black having a surface area of approximately 30 square meters per gram with polytetrafluoroethylene was spread to give a surface distribution of 17.5 milligrams platinum black and 1.6 milligrams polytetrafluoroethylene per square centimeter over the electrode area. A second spread of a platinum black-polytetrafluoroethylene slurry was then prepared to give a similar coverage on a second casting surface that was not coated with a polytetrafluoroethylene film. Terminal grids of 40-mesh, 4.5 mil diameter wire, nickel screen that had been rolled to a thickness of 4.5 mils were used with the above cast surfaces to prepare completed electrodes as described under the general procedure. Pressures of 2800 lbs./sq. inch of electrode surface were used in these preparations. The finished electrodes contained 35 milligrams platinum black and 3.2 milligrams polytetrafluoroethylene binder per square centimeter and surface films as indicated above. Pairs of electrodes of each composition were made for use in the fuel cells described in Example 2.

Example 2

Utilizing the general construction details as shown in the drawing, four fuel cells were made, each using a pair of electrodes in which the thickness of the polytetrafluoroethylene film on the electrode was the same for each pair of electrodes utilized in one cell, but varying for each of the four cells. The spacer was ⅛ inch thick, having a 1½ inch diameter circular hole, as did also the gaskets used to hold the electrodes against the spacer. In the first series of runs with these cells, hydrogen was used as the fuel gas and oxygen was used as the oxidant gas, both being supplied from compressed gas cylinders. In the second series of runs, the end plate on the oxidant side was replaced with an annular circular end plate having a 1½ inch diameter hole which exposed the electrode to air which served as the oxidant. The electrolyte of aqueous 6-molar potassium hydroxide solution was connected to a reservoir containing a volume of about 80 milliliters. During operation of the cells, enough heat was generated within the cell so that the electrolyte was circulated from the cell to the reservoir due to a thermal gradient effect. During operation of the fuel cells on hydrogen and oxygen, water slowly accumulated in the electrolyte. Dilution was not serious during the duration of the tests and methods of compensation described above were not required. During operation on hydrogen and air, evaporation of water occurred at the air electrode faster than it was being formed from the cell reaction. Again, however, the change in concentration occurring during the tests was not great enough to require compensation by the addition of water to the system. The cell characteristics were determined for these fuel cells and are recorded in Table I for the fuel cell operating on hydrogen and oxygen, and in Table II for the cells operating on hydrogen and air.

TABLE I.—PERFORMANCE OF CELLS ON HYDROGEN AND OXYGEN AS SURFACE FILM THICKNESS IS VARIED

| Current Density, ma./cm.$^2$ | Cell Voltage | | | |
| --- | --- | --- | --- | --- |
| | 0.79 mg./cm.$^2$ films | 1.6 mg./cm.$^2$ films | 2.4 mg./cm.$^2$ films | 3.9 mg./cm.$^2$ films |
| 50 | 0.91 | 0.91 | 0.91 | 0.91 |
| 100 | 0.85 | 0.85 | 0.85 | 0.85 |
| 200 | 0.78 | 0.76 | 0.78 | 0.78 |
| 300 | 0.71 | 0.69 | 0.73 | 0.72 |
| 400 | 0.66 | 0.63 | 0.69 | 0.66 |
| 500 | ------ | 0.57 | ------ | 0.61 |
| 600 | ------ | 0.52 | ------ | 0.56 |
| 700 | ------ | 0.46 | ------ | 0.51 |

TABLE II.—PERFORMANCE OF CELLS ON HYDROGEN AND AIR AS SURFACE FILM THICKNESS IS VARIED

| Current Density, ma./cm.$^2$ | Cell Voltage | | |
| --- | --- | --- | --- |
| | 1.6 mg./cm.$^2$ films | 2.4 mg./cm.$^2$ films | 3.9 mg./cm.$^2$ films |
| 50 | 0.86 | 0.87 | 0.86 |
| 100 | 0.80 | 0.82 | 0.80 |
| 150 | 0.74 | 0.77 | 0.73 |
| 200 | 0.70 | 0.73 | 0.63 |
| 250 | 0.66 | 0.68 | 0.33 |
| 300 | 0.62 | 0.64 | 0.08 |
| 400 | 0.54 | 0.56 | ------ |
| 500 | 0.45 | 0.47 | ------ |

From the above results, it is evident that the thickness of the polytetrafluoroethylene film on the gas side of the fuel cell had very little effect on the operation of the cells during operation on hydrogen and oxygen. When operated on hydrogen and air, the thinner films result in better performance. This is reasonable in that nitrogen from the air can accumulate in the pores and thereby reduce the accessibility of oxygen to the electrochemically active sites. Such blocking would increase as the pore length increases with film thickness. However, even the thickest films tested resulted in remarkably good performances on hydrogen and air, and in particular they are markedly better than those previously known, e.g., sintered metal electrodes, porous carbon electrodes, etc.

Although it would be expected that the fuel cells would operate better on hydrogen and oxygen, some of the difference in performance is due to the fact that evaporation of water from the fuel cells operating on air, cools the fuel cells so that they are operating at a lower temperature than the fuel cells operating on hydrogen and oxygen. At equal current densities, the internal resistance of the hydrogen-air cells is higher and the activity of the electrodes is lower than in the hydrogen-oxygen cells because of the lower temperature. This accounts in part for the lower performance of the fuel cells when operating on air rather than on oxygen in this example.

Cells of this type have been operated on continuous load for over 275 days. During this time, the current output was maintained at either 88 ma./cm.$^2$ or 263 ma./cm.$^2$. Little difference was noted in cell performance when 12 N potassium hydroxide was used as the electrolyte.

Example 3

In order to study the effect of the thickness of the polytetrafluoroethylene-metal layer, the electrodes were made up as described in Example 1 in which the polytetrafluoroethylene film thickness was maintained at 2.4 milligrams of polytetrafluoroethylene per square centimeter of electrode area, and varying amounts of polytetrafluoroethylene-platinum black, in which the ratio of platinum to polytetrafluoroethylene was maintained constant at 1 gram of platinum to 0.09 gram of polytetrafluoroethylene, were used to vary the electrode thickness from 17 to 45 milligrams of platinum per square centimeter of electrode area. When pairs of these electrodes were used in the fuel cells, the results were similar to those shown in Tables I and II for the fuel cell having a polytetrafluoroethylene film on the gas side of the electrode having 2.4 milligrams of polytetrafluoroethylene per square centimeter of surface area. These results indicate that the thickness of the polytetrafluoroethylene-metal layer is not critical and has relatively little effect on the operation of the fuel cells over the range studied.

Example 4

A 0.125 mil commercially available film of polytetrafluoroethylene was molded onto one surface of a preformed sintered layer containing 35 milligrams of platinum black per square centimeter and a ratio of platinum to polytetrafluoroethylene of 1 gram of platinum to 0.09 gram of polytetrafluoroethylene. Fuel cells incorporating these electrodes were operated at current densities as high as 600 milliamperes per square centimeter utilizing hydrogen and oxygen.

Example 5

When electrodes were made similar to that shown in Example 1, in which the nickel screen terminal grid was replaced with either platinum or silver screens, it was found that there was no difference in the performance of fuel cells incorporating these electrodes which was not attributable to the difference in resistivity of the screens themselves.

Example 6

A study was made varying the platinum to polytetrafluoroethylene ratio. It was found that electrodes of satisfactory strength and performance can be obtained over the range from 20 grams of platinum black to 1 gram of polytetrafluoroethylene to as little as 2 grams of platinum black to 1 gram of polytetrafluoroethylene. Since the density of platinum is 21.45 g./cc. and the density of polytetrafluoroethylene is 2.13 g./cc., the above range on a weight basis becomes 0.2 to 2.0 parts by volume of platinum per volume of polytetrafluoroethylene on a volume basis. The volume ratio would be applicable to all metals since the volume ratio is independent of the difference in densities of the various metals. It is, of course, apparent that the volumes of these materials are not the apparent volumes which are dependent to a great extent on the degree of subdivision and degree of packing of the individual particles but are the true volumes of the mass of the metal and polytetrafluoroethylene. Incorporating larger amounts of metal powder affects the mechanical strength adversely, while utilizing lower amounts of metal reduces the cell performance.

Example 7

Electrodes were made similar to that described in Example 1 in which the polytetrafluoroethylene surface film contained 2.4 milligrams of polytetrafluoroethylene per square centimeter and the resin-metal layer contained 70 milligrams of silver flake made from 325-mesh silver powder and 7 milligrams of polytetrafluoroethylene per square centimeter of electrode area, and other electrodes were made with the same thickness of polytetrafluoroethylene film, but the metal-containing layer was 17 milligrams of amorphous carbon containing 10% platinum and 3 milligrams of polytetrafluoroethylene per square centimeter of electrode area. These electrodes were used as the oxygen electrodes in fuel cells similar to those described in Example 2. Platinum black-polytetrafluoroethylene electrodes were used as the hydrogen electrodes, and a 6-molar aqueous potassium hydroxide solution was used as the electrolyte. The performance of these two fuel cells is shown in Table III.

TABLE III.—PERFORMANCE OF CELLS PREPARED WITH ELECTRODES CONTAINING SILVER AND PLATINIZED CARBON

| Current Density, ma./cm.$^2$ | Cell Voltage | |
|---|---|---|
| | Silver Electrode as Cathode | Platinized Carbon Electrode as Cathode |
| 25 | 0.79 | 0.87 |
| 50 | 0.70 | 0.82 |
| 100 | 0.55 | 0.73 |
| 150 | 0.41 | 0.63 |
| 200 | 0.29 | 0.51 |
| 250 | 0.18 | 0.38 |
| 300 | 0.08 | 0.25 |

Both of these cells were operable on continuous load of 88 milliamperes per square centimeter for over 60 days with satisfactory performance.

Example 8

Fuel cells similar to those in Example 2, but employing electrodes having polytetrafluoroethylene surface films containing 2.4 milligrams of polytetrafluoroethylene per square centimeter, a resin-metal layer containing 40 milligrams of platinum black and 3.6 milligrams of polytetrafluoroethylene per square centimeter, and a terminal grid of 45-mesh, 7.8 mil diameter wire, platinum screen that was rolled to a thickness of 8 mils, were operated with 5 normal sulfuric acid as the electrolyte. The performance of such a cell operating on hydrogen and oxygen with the electrolyte in a circulating thermal loop is shown in Table IV.

TABLE IV

Performance of a hydrogen-oxygen cell with a sulfuric acid electrolyte

| Current density ma./cm.$^2$: | Cell voltage |
|---|---|
| 25 | 0.94 |
| 50 | 0.89 |
| 100 | 0.84 |
| 150 | 0.80 |
| 200 | 0.75 |
| 250 | 0.71 |
| 300 | 0.67 |
| 350 | 0.62 |

Example 9

The fuel cell of Example 8 was modified to run on air by employing the open face plate described in Example 2 and operated with 5 normal sulfuric acid as the electrolyte, hydrogen as the fuel and air as the oxidant. When operated in this fashion, evaporation of water from the electrolyte exceeds the rate of production of water in the cell reaction. The cell was operated with a thermal loop which circulated the electrolyte from the electrolyte chamber in the cell to a reservoir where water was added periodically to maintain an essentially constant volume. The fuel cell was also operated without the thermal loop. In this case, a constant volume of electrolyte was maintained in the electrolyte chamber by direct addition of water to the chamber from a reservoir on top of the fuel cell.

Performance data for extended operation at a constant drain of 88 ma./cm.$^2$ are shown in Table V.

TABLE V.—EXTENDED PERFORMANCE OF HYDROGEN AIR CELLS WITH AND WITHOUT A THERMAL LOOP

[Current Density=88 ma./cm.$^2$]

| Time of Operation, Hours | Cell Voltage | |
|---|---|---|
| | Operation with Thermal Loop | Operation without Thermal Loop |
| 0 | 0.67 | 0.70 |
| 2 | 0.68 | 0.69 |
| 5 | 0.68 | 0.69 |
| 10 | 0.68 | 0.69 |
| 15 | 0.68 | 0.68 |
| 20 | 9.68 | 0.68 |

These data demonstrate two modes of satisfactorily operating the cells for extended periods of time.

Example 10

Fuel cells like those in Example 8 were operated at 89° C. with 6 normal sulfuric acid as the electrolyte, oxygen as the oxidant, and ethane, ethylene and propylene as the fuels. The performance of these cells is shown in Table VI.

TABLE VI.—PERFORMANCE OF CELLS EMPLOYING HYDROCARBON FUELS AT 89° C.

| Current Density, ma./cm.$^2$ | Cell Voltage | | |
|---|---|---|---|
| | Ethane | Ethylene | Propylene |
| 2 | 0.66 | 0.60 | 0.62 |
| 5 | 0.56 | 0.51 | 0.61 |
| 10 | 0.48 | 0.43 | 0.41 |
| 15 | 0.43 | 0.37 | 0.36 |
| 20 | 0.38 | 0.32 | 0.32 |
| 25 | 0.33 | 0.28 | 0.30 |
| 30 | | 0.25 | 0.27 |
| 50 | | 0.17 | 0.20 |
| 70 | | 0.10 | 0.14 |
| 90 | | 0.04 | 0.08 |

Example 11

The fuel cell of Example 9 was reassembled as described in Example 8 and operated with 5 normal sulfuric acid as the electrolyte, carbon monoxide as the fuel and oxygen as the oxidant. The performance of the cell at ambient room temperature is shown in Table VII.

TABLE VII

Performance of a cell employing carbon monoxide as the fuel at room temperature

| Current density ma./cm.$^2$ | Cell voltage |
|---|---|
| 1 | 0.60 |
| 2 | 0.45 |
| 5 | 0.28 |
| 10 | 0.13 |
| 15 | 0.08 |
| 20 | 0.05 |

When the fuel cells were constructed with the polytetrafluoroethylene side of the electrodes in contact with the electrolyte, the performance of the cell was markedly inferior to the performance of the cells described above where the polytetrafluoroethylene side of the electrode was in contact with the gas phase.

In the foregoing examples it is to be noted that the current is expressed in terms of current per unit area of electrode, i.e., milliamperes per square centimeter of electrode area, and not in terms of the total current for the full area of the fuel cell. By such conversion to a unit area, comparison of the performance of different size cells is facilitated.

The procedures given in the above examples are not limited to the particular metal catalysts described. Other catalytically active metals previously described may be used as well.

It is of importance to remember that the volume measures of the catalyst-to-binder are more significant than the weight ratios. The appropriate weight ratios of the catalyst-to-binder can therefore be estimated from the data in the examples by using the density ratios to calculate the weights of the materials required to maintain the same volume ratios as for the particular ratios described.

Other modifications of this invention and variations in the structure may be employed without departing from the scope of the invention. For example, the shape of the cell may be varied and may be conveniently chosen to fit into an existing space. Two or more of these cells may be joined together to produce batteries.

The fuel cells of this invention may be used for any application where a reliable source of direct current electric power is required to activate motors, instruments, radio transmitters, lights, heaters, etc. The power from the fuel cells may also be used to drive a thermoelectric refrigerator which requires a low voltage source of direct current.

These and other modifications of this invention which will be readily discernible to those skilled in the art, may be employed within the scope of the invention. The invention is intended to include all such modifications and variations as may be embraced within the following claims.

What we claim as new and desire to secure by Letters Patent of the United States is:

1. A gaseous fuel cell comprising an aqueous electrolyte solution which is positioned between and in direct electrical contact with a pair of gas permeable, hydrophobic, electronically conductive electrode elements, each of said electrode elements comprising gas absorbing metal particles bonded together into a cohesive mass with polytetrafluoroethylene and having a thin gas permeable film consisting essentially of polytetrafluoroethylene bonded to the surface in contact with the gas phase, said gas adsorbing metal particles bonded together with polytetrafluoroethylene being present in the ratio, on a volume basis, of from 0.2 to 5.2 parts of said particles per part of polytetrafluoroethylene, means for supplying a fuel gas to one of said electrode elements and means for supplying an oxidant gas to the other of said electrode elements.

2. Fuel cells of claim 1 wherein the gas adsorbing metal is associated in electrically conductive relation with carbon to form gas adsorbing metal particles.

3. Fuel cells of claim 1 wherein the gas adsorbing metal particles are particles of at least one metal of the Group VIII series of metals.

4. Fuel cells of claim 1 wherein the gas adsorbing metal particles are particles of at least one of the noble metals of the Group VIII series of metals.

5. Fuel cells of claim 1 wherein the gas adsorbing metal particles are particles of platinum.

6. Fuel cells of claim 1 wherein the gas adsorbing metal particles are particles of silver.

7. Fuel cells of claim 1 wherein the electrolyte is an aqueous solution of sulfuric acid.

8. Fuel cells of claim 1 wherein the electrolyte is an aqueous solution of an alkali metal hydroxide.

9. Improved gas permeable, hydrophobic electrode structures comprising gas adsorbing metal particles bonded together with polytetrafluoroethylene and having a thin gas permeable film consisting essentially of polytetrafluoroethylene bonded on one of its two major surfaces, said gas adsorbing metal particles bonded together with polytetrafluoroethylene being present in the ratio, on a volume basis, of from 0.2 to 5.2 parts of said particles per part of polytetrafluoroethylene.

10. The electrode structures of claim 9 wherein the gas adsorbing metal particles are at least one of the metals of the Group VIII series of metals.

11. The electrode structures of claim 9 wherein the gas adsorbing metal particles are at least one of the noble metals of the Group VIII series of metals.

12. The electrode structures of claim 9 wherein the gas adsorbing metal particles are platinum.

13. The electrode structures of claim 9 wherein the gas adsorbing metal particles are silver.

14. The electrode structures of claim 9 wherein the gas adsorbing metal is associated in electrically conductive relation with carbon to form gas adsorbing metal particles.

15. A gaseous fuel cell comprising an aqueous electrolyte solution which is positioned between and in direct electrical contact with a pair of gas permeable, hydrophobic, electronically conductive electrode elements, each of said electrode elements comprising gas absorbing metal particles bonded together into a cohesive mass with polytetrafluoroethylene and having a thin gas permeable film consisting essentially of polytetrafluoroethylene bonded to the surface in contact with the gas phase, said gas adsorbing metal particles bonded together with polytetrafluoroethylene being present in the ratio, on a volume basis, of from 0.2 to 2.0 parts of said particles per part of polytetrafluoroethylene, means for supplying a fuel gas to one of said electrode elements, and means for supplying an oxidant gas to the other of said electrode elements.

16. Improved gas permeable, hydrophobic electrode structures comprising gas adsorbing metal particles bonded together with polytetrafluoroethylene and having a thin gas permeable film consisting essentially of polytetrafluoroethylene bonded on one of its two major surfaces, said gas adsorbing metal particles bonded together with polytetrafluoroethylene being present in the ratio, on a volume basis, of from 0.2 to 2.0 parts of said particles per part of polytetrafluoroethylene.

References Cited

UNITED STATES PATENTS

| | | | |
|---|---|---|---|
| 3,080,440 | 3/1963 | Ruetschi et al. | 136—86 |
| 3,132,973 | 5/1964 | Duddy et al. | 136—86 |
| 3,097,116 | 7/1963 | Moos | 136—86 |

FOREIGN PATENTS 233,847    5/1961    Australia.

WINSTON A. DOUGLAS, *Primary Examiner.*

HUGH FEELEY, *Assistant Examiner.*

U.S. Cl. X.R.

136—120